United States Patent
Porsch et al.

(10) Patent No.: US 9,592,844 B2
(45) Date of Patent: Mar. 14, 2017

(54) LOCOMOTIVE DRIVER'S CAB

(71) Applicant: SIEMENS AKTIENGESELLSCHAFT, Munich (DE)

(72) Inventors: Roland Porsch, Speichersdorf (DE); Wilhelm Schaeper, Ebermannstadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/227,311

(22) Filed: Mar. 27, 2014

(65) Prior Publication Data

US 2014/0209757 A1   Jul. 31, 2014

Related U.S. Application Data

(63) Continuation of application No. PCT/EP2012/068936, filed on Sep. 26, 2012.

(30) Foreign Application Priority Data

Sep. 27, 2011   (DE) .......... 10 2011 083 534

(51) Int. Cl.
*B61L 15/00* (2006.01)
*G02B 27/01* (2006.01)

(52) U.S. Cl.
CPC ............ *B61L 15/009* (2013.01); *G02B 27/01* (2013.01); *G02B 2027/014* (2013.01); *G02B 2027/0138* (2013.01)

(58) Field of Classification Search
CPC .... B61L 3/00; B61L 3/002; B61L 5/00; B61L 5/12; B61L 15/00; B61L 15/0072; B61L 15/0081; B61L 15/009
USPC ................... 246/167 R, 174, 184, 185, 191
See application file for complete search history.

(56) References Cited

U.S. PATENT DOCUMENTS

| | | | |
|---|---|---|---|
| 4,927,234 A | 5/1990 | Banbury et al. | |
| 5,519,410 A * | 5/1996 | Smalanskas | B60K 35/00 340/980 |
| 5,978,718 A | 11/1999 | Kull | |
| 6,163,755 A | 12/2000 | Peer et al. | |
| 8,519,362 B2 | 8/2013 | Labrot et al. | |

(Continued)

FOREIGN PATENT DOCUMENTS

| CN | 1214656 A | 4/1999 |
|---|---|---|
| CN | 1629930 A | 6/2005 |

(Continued)

OTHER PUBLICATIONS

Andrew Roden: "Heads up!", International Railway Journal, Simmons-Boardman Publishing Corp, United States, Jan. 1, 2008, (Jan. 1, 2008), pp. 30-31, XP001537933.

(Continued)

*Primary Examiner* — R. J. McCarry, Jr.
(74) *Attorney, Agent, or Firm* — Laurence Greenberg; Werner Stemer; Ralph Locher

(57) ABSTRACT

A locomotive driver's cab allows a locomotive driver a comparatively long time for observing a route by providing the locomotive driver's cab with a front vision display for displaying rail-vehicle-relevant information in the field of vision of the locomotive driver.

7 Claims, 4 Drawing Sheets

(56) References Cited

U.S. PATENT DOCUMENTS

2005/0154505 A1     7/2005   Nakamura et al.

FOREIGN PATENT DOCUMENTS

| | | |
|---|---|---|
| CN | 201499255 U | 6/2010 |
| DE | 3879044 T2 | 7/1993 |
| DE | 69809650 T2 | 5/2003 |
| DE | 69731009 T2 | 11/2005 |
| DE | 102005029956 A1 | 2/2006 |
| DE | 102007010867 A1 | 9/2008 |
| EP | 0305096 A2 | 3/1989 |
| GB | 2384379 A | 7/2003 |
| JP | H03116300 A | 5/1991 |
| JP | H0450041 A | 2/1992 |
| JP | H0538965 A | 2/1993 |
| JP | H0538966 A | 2/1993 |
| JP | 2007102691 A | 4/2007 |
| RU | 93053869 A | 7/1996 |
| WO | 9731810 A1 | 9/1997 |
| WO | 2009122094 A1 | 10/2009 |

OTHER PUBLICATIONS

Head-up Display, Wikipedia, http://de.wikipedia.org/wiki/Head-up-Display—Statement of Relevance.

EUDDplus—"Realisierung eines europäischen Lokführerstandskonzeptes"; THEMA Innovationen bei Fahrzeugen und Infrastrucktur, ETR Sep. 2010, pp. 532-538—Statement of Relevance.

\* cited by examiner

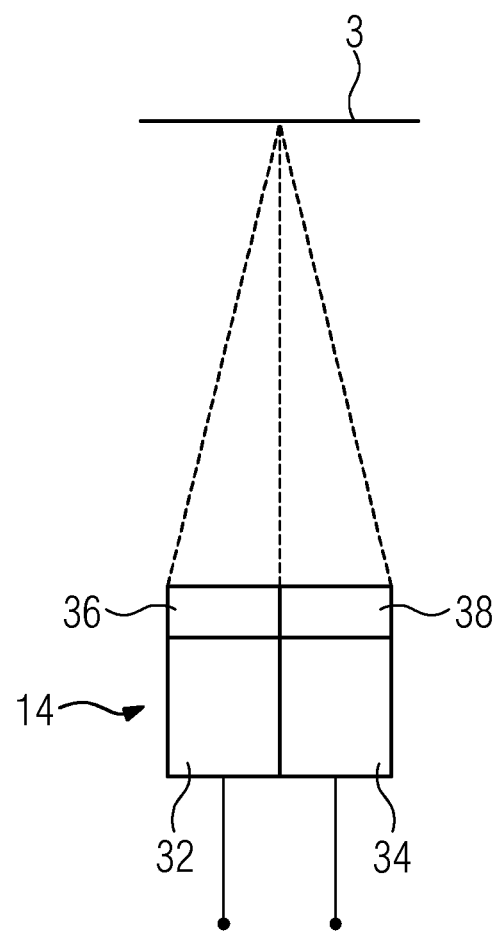

LOCOMOTIVE DRIVER'S CAB

CROSS-REFERENCE TO RELATED APPLICATION

This is a continuation, under 35 U.S.C. §120, of copending International Application No. PCT/EP2012/068936, filed Sep. 26, 2012, which designated the United States; this application also claims the priority, under 35 U.S.C. §119, of German Patent Application DE 10 2011 083 534.2, filed Sep. 27, 2011; the prior applications are herewith incorporated by reference in their entirety.

BACKGROUND OF THE INVENTION

Field of the Invention

At present, as can be seen from the periodical "ETR", September 2010, No. 09, pages 532 to 538, there is work on the standardization and harmonization of the functional configuration and construction of a future European driver's cab for locomotives and traction units. Within that work, the concept of a locomotive driver's cab having four displays that are disposed in a ring configuration beneath the windshield of the locomotive driver's cab, has been developed. The locomotive driver must monitor the track and must additionally observe the four displays while the railway vehicle is traveling.

SUMMARY OF THE INVENTION

It is accordingly an object of the invention to provide a locomotive driver's cab, which overcomes the hereinafore-mentioned disadvantages of the heretofore-known cabs of this general type and which allows the locomotive driver more time to observe the track and thus contributes to increasing safety in rail traffic.

With the foregoing and other objects in view there is provided, in accordance with the invention, a locomotive driver's cab, comprising a front-view display with a display of information relevant to the railway vehicle in the field of view of the driver of the locomotive.

There are front-view displays known from the following website: http://de.wikipedia.org/wiki/Head-up-Display, which are used in military aircraft for displaying information relating to avionic, radar or weapon systems and in automobiles for speed displays, but to date it has not been known to use front view displays with their accompanying significant advantages, in modern locomotive driver's cabs having a relatively large number of displays.

There is thus a significant advantage of the locomotive driver's cab according to the invention in that with it the information relevant to the railway vehicle is disposed in the field of view of the driver of the locomotive and can therefore be perceived by the driver together with the track observation. The locomotive driver therefore has to take notice of the displays less often than heretofore and can concern himself or herself more intensively than previously with track observation. This also contributes to increasing traffic safety.

With the locomotive driver's cab according to the invention, the projection screen of the front-view display can be constructed differently. For example, the projection screen can be disposed as an additional projection panel in front of or behind the windshield of the locomotive driver's cab in the field of view of the driver of the locomotive. It is seen as particularly advantageous, however, if the windshield of the railway vehicle is the projection screen of the front-view display.

The imaging unit of the front-view display is advantageously connected to important systems of a railway vehicle in order to be able to access information relevant to the railway vehicle and to be able to display the same on the projection screen of the front-view display. It is therefore advantageous that the imaging unit of the front-view display be connected to the operating system of the vehicle controller and be connected to the operating system of the train protection system.

It is seen as particularly advantageous if the imaging unit of the front-view display is connected to an evaluation device of a camera system at the front of the railway vehicle constructed in such a way that the respective track route is displayed on the projection screen.

There is then also the advantageous possibility of constructing the evaluation device in such a way that the respective track route is marked on the projection screen with a stopping point assuming full braking and is thus easy to read for the locomotive driver. It is further advantageous, regarding the increase in traffic safety, if the evaluation device is constructed in such a way that in each case the track route is displayed while recording obstructions on the projection screen. It contributes to the further facilitation of the work of the driver of the locomotive and to increased traffic safety if in the locomotive driver's cab according to the invention the image generating unit, being supplied with two similar types of information from different systems, is constructed in such a way that it outputs optical signals of different colors for the information from the different systems, and the optical module of the windshield display contains two mirror systems in such an orientation that the optical signals relating to different information are incident in the same place on the projection screen. If the information from the two systems is the same then this results in a display on the projection screen with mixed colors that is easy to read. If, on the other hand, the information is different, it results in a display with a different color and a different shape. The locomotive driver can thus tell immediately that the information no longer agrees, which points to impaired information generation in one of the two systems.

The two similar types of information can advantageously be safety-relevant information.

It is also advantageous if the two similar types of information are speed information and if the optical signals relating to the different speed information each produce a seven segment display at the same point on the projection screen. If the speed information is the same, it results in an easily legible seven segment display in a uniform mixed color. If the two items of speed information differ from each other, this results in information on the projection screen of the front-view display that is not easily legible, because two different seven segment displays are overlaid and a non-uniform color image results.

Other features which are considered as characteristic for the invention are set forth in the appended claims.

Although the invention is illustrated and described herein as embodied in a locomotive driver's cab, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 5 is a front-elevational view of an imaging unit.

DETAILED DESCRIPTION OF THE INVENTION

Figure 1:
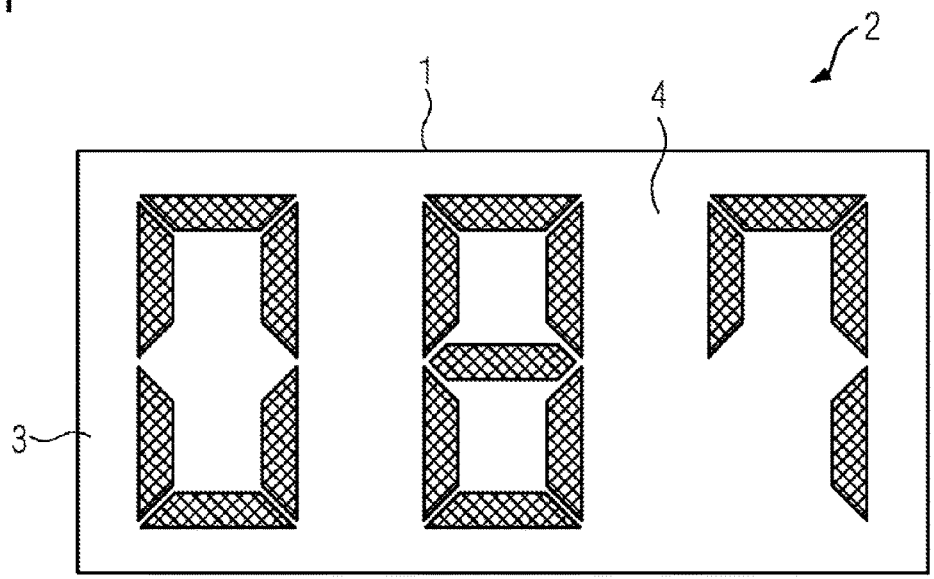
FIG. 1 is a diagrammatic, front-elevational view of a section of a windshield forming a projection screen of a front-view display of a locomotive driver's cab according to the invention, showing a correct display of a speed.
Figure 2:
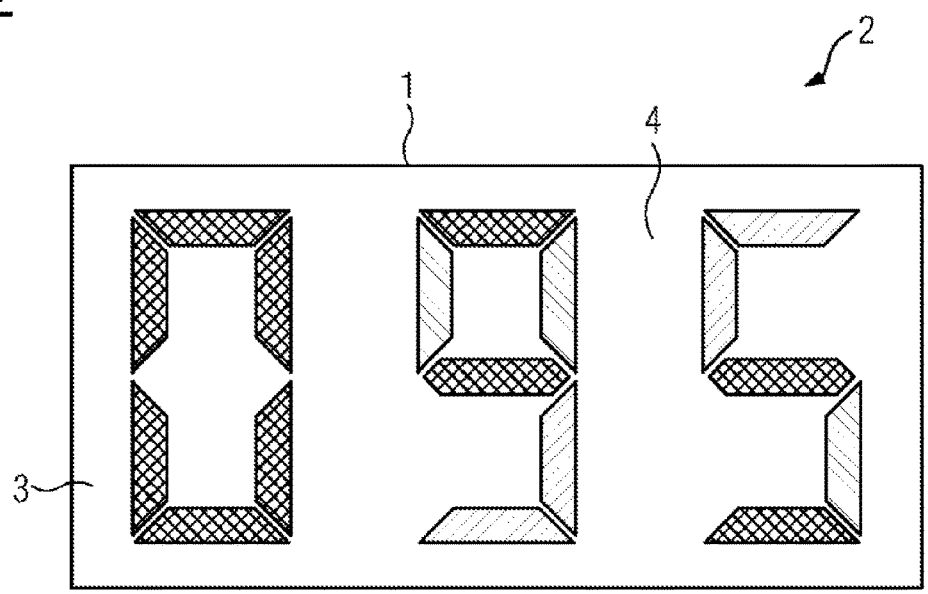
FIG. 2 is a view similar to FIG. 1 of the same section but illustrating an incorrect display.

Referring now to the figures of the drawings in detail and first, particularly, to FIGS. 1 and 2 thereof, there is seen a section 1 of a windshield 2 of a locomotive driver's cab, which also forms a section of a projection screen 3 of a front-view display which, apart from the projection screen 3, includes an imaging unit and an optical module in a known manner. The imaging unit is, however, implemented with two imaging devices in this case, in such a way that it can be provided with speed information from two systems of the railway vehicle and outputs optical signals of different color, e.g. green and yellow. Accordingly, the optical module is equipped with two mirror systems, which are disposed in such a way that they direct optical signals onto the illustrated section 1 one above the other, forming a seven segment display 4 of the speed of the railway vehicle.

FIG. 1 shows a correct seven segment display 4 with speed information "087". In this case, the green (right hashed) and yellow (left hatched) illuminated segments of the seven segment display 4 from the two imaging devices are fully aligned with each other. The speed information is therefore easy to read for the locomotive driver on all segments because of the uniform blue mixed color (cross-hatched) and moreover it signals to the driver that the speed measurement with the two systems of the railway vehicle is correct.

FIG. 2 shows an impaired speed display in which "0" is correctly reproduced because it uniformly shows the blue mixed color. However, this no longer applies with regard to the other numbers, which have blue areas (cross-hatched), green areas (right hatched) and a yellow area (left hatched) and hence notify the locomotive driver of a faulty speed determination.

Figure 3:
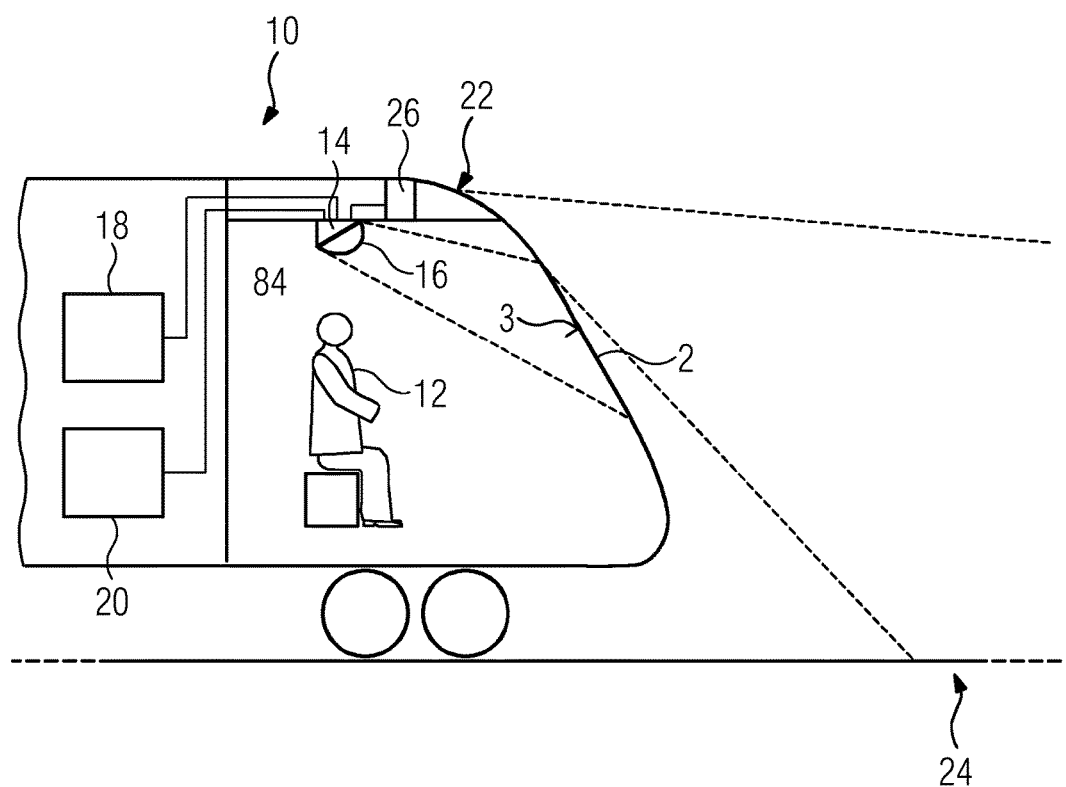
FIG. 3 is a fragmentary, side-elevational view of a railway vehicle in which a locomotive driver's cab is installed.

FIG. 3 shows a railway vehicle 10 in which the locomotive driver's cab is installed. A position of a driver 12 is shown schematically. The vehicle 10 includes the windshield 2 which forms the projection screen 3 of the front-view display. The front-view display includes, apart from the projection screen 3, an imaging unit 14 and an optical module 16. The imaging unit 14 is connected to the operating system of a vehicle controller 18 and the operating system of a train protection device 20.

Figure 4:
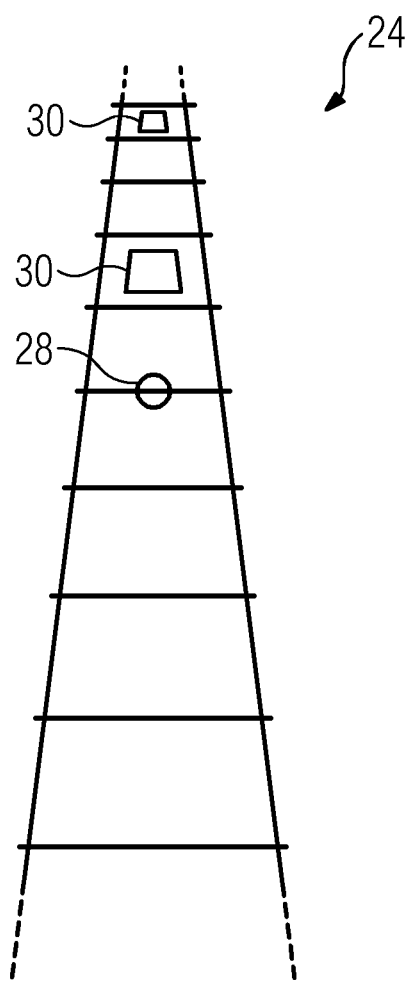
FIG. 4 is a perspective view of a camera system for displaying a track route.

The railway vehicle 10 also includes a camera system 22 at its front that is constructed in such a way that a track route 24 is displayed on the projection screen in each case. The imaging unit 14 is connected to an evaluation device 26 of the camera system 22. As is shown in FIG. 4, this device 26 is constructed in such a way that the displayed track route is marked on the projection screen 3 with a stopping point 28, which indicates the point at which the railway vehicle 10 can be stopped if full braking is applied. FIG. 4 also shows a marking of the displayed track route with obstacles 30 detected by the camera system 22.

FIG. 5 is a detailed view of the imaging unit 14 and the optical module 16. This unit 14 includes two imaging devices 32 and 34 in such a way that it can be provided with speed information from two systems of the railway vehicle 10 and outputs optical signals of different color. As explained above, the optical module 16 is equipped with two mirror systems 36, 38 which are disposed in such a way that they direct optical signals onto the illustrated section 1 one above the other, forming the seven segment display 4 of the speed of the railway vehicle 10 on the projection screen 3.

The invention claimed is:

1. A locomotive driver's cab of a railway vehicle, the locomotive driver's cab comprising:
   a front-view display for displaying information relevant to the railway vehicle;
   said front-view display having a projection screen being a windshield of the railway vehicle;
   said front-view display having an imaging unit supplied with two similar types of information from different systems and configured to output optical signals of different color for said information from said different systems;
   said front-view display having an optical module containing two mirror systems aligned to cause the optical signals relating to different information to be incident at the same point on said projection screen, the optical signals each providing a respective projection on said projection screen having a shape depending on said information to be displayed; and
   said optical module superimposing said information from said different systems on said projection screen to permit the driver to check an agreement between said information from said different systems by layering the optical signals over one another such that:
   a) if said information from said two systems is the same, a resulting projection of the optical signals on said projection screen
      a1) has a shape corresponding to a shape of said projection of each optical signal and
      a2) has a color being a mixture of the different colors of the optical signals, and
   b) if said information from said two systems is different, a resulting projection has different colors and a different shape.

2. The locomotive driver's cab according to claim 1, which further comprises:
   a train protection device having an operating system; and
   a vehicle controller having an operating system;
   said imaging unit being connected to said operating system of said vehicle controller and said operating system of said train protection device.

3. The locomotive driver's cab according to claim 1, which further comprises:
   a camera system disposed at a front of the railway vehicle and having an evaluation device;
   said imaging unit being connected to said evaluation device for displaying a track route on said projection screen.

4. The locomotive driver's cab according to claim 3, wherein said evaluation device cooperates with the imaging unit such that the track route displayed on said projection screen is marked with a stopping point, said stopping point corresponding to a point on the track being reached when a full braking of the vehicle is performed.

5. The locomotive driver's cab according to claim 3, wherein said evaluation device is configured to display the track route on said projection screen with detection of obstructions.

6. The locomotive driver's cab according to claim 1, wherein said two similar types of information are safety-relevant information.

7. The locomotive driver's cab according to claim 1, wherein said two similar types of information are speed information, and the optical signals are relevant to different speed information and each produce a seven segment display on the same point of said projection screen.

\* \* \* \* \*